(12) United States Patent
Kennedy

(10) Patent No.: US 10,498,566 B2
(45) Date of Patent: Dec. 3, 2019

(54) SMALL CELL BASE STATIONS HAVING DRONE-MOUNTED RADIO UNITS AND RELATED SYSTEMS AND METHODS

(71) Applicant: CommScope Technologies LLC, Hickory, NC (US)

(72) Inventor: Bryan K. Kennedy, Norcross, GA (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 15/936,539

(22) Filed: Mar. 27, 2018

(65) Prior Publication Data

US 2018/0287833 A1 Oct. 4, 2018

Related U.S. Application Data

(60) Provisional application No. 62/478,064, filed on Mar. 29, 2017.

(51) Int. Cl.
*H04L 25/26* (2006.01)
*H04B 10/2575* (2013.01)
*H04L 12/703* (2013.01)

(52) U.S. Cl.
CPC ....... *H04L 25/26* (2013.01); *H04B 10/25754* (2013.01); *H04L 45/28* (2013.01)

(58) Field of Classification Search
CPC ........ H04B 10/25754; H04B 10/25753; H04L 25/26
USPC ........................................................ 375/257
See application file for complete search history.

(56) References Cited

U.S. PATENT DOCUMENTS

| | | | |
|---|---|---|---|
| 5,751,603 A * | 5/1998 | Landolf | G06F 1/305 324/416 |
| 9,281,896 B2 | 3/2016 | Teller et al. | |
| 2011/0116794 A1* | 5/2011 | George | H04B 10/25754 398/45 |
| 2012/0098463 A1* | 4/2012 | Stamm | H05B 33/0815 315/307 |

(Continued)

FOREIGN PATENT DOCUMENTS

| | | | | |
|---|---|---|---|---|
| KR | 10-2017-0033392 A | 3/2017 | | |
| WO | 2013-052178 A2 | 4/2013 | | |
| WO | WO-2018089859 A1 * | 5/2018 | ........... | B64C 39/022 |

OTHER PUBLICATIONS

Notification of Transmittal of the International Search Report and the Written Opinion of the International Searching Authority, or the Declaration, for corresponding International Application No. PCT/US2018/024310, dated Jul. 10, 2018, 11 pp.

(Continued)

*Primary Examiner* — Kevin M Burd
(74) *Attorney, Agent, or Firm* — Myers Bigel, P.A.

(57) ABSTRACT

A base station system includes a central hub having a baseband controller and a backhaul connection to an external network and a plurality of remote units that are connected to the central hub by respective wired power and cabling connections, each remote unit including an associated drone unit that has an aerial drone and a radio unit mounted thereon. The radio units are operated under control of the baseband controller to form a super cell that appears as a single base station to the external network.

19 Claims, 10 Drawing Sheets

(56) References Cited

U.S. PATENT DOCUMENTS

| | | | | |
|---|---|---|---|---|
| 2012/0281091 | A1* | 11/2012 | Leblond | H04W 76/36 |
| | | | | 348/143 |
| 2013/0233964 | A1 | 9/2013 | Woodworth et al. | |
| 2014/0258742 | A1* | 9/2014 | Chien | H04L 12/10 |
| | | | | 713/300 |
| 2015/0112513 | A1* | 4/2015 | Kerins | B63G 8/001 |
| | | | | 701/2 |
| 2015/0326317 | A1* | 11/2015 | Michaelis | H04B 10/807 |
| | | | | 398/115 |
| 2016/0241326 | A1* | 8/2016 | Korpela | H04B 7/18502 |
| 2017/0208512 | A1 | 7/2017 | Aydin et al. | |
| 2017/0257779 | A1* | 9/2017 | Zerick | H04W 24/02 |
| 2018/0287696 | A1* | 10/2018 | Barbieri | H04B 7/15507 |

OTHER PUBLICATIONS

Art Pregler, "When COWs Fly: AT&T Sending LTE Signals from Drones," AT&T Innovation Blog, http://about.att.com/innovationblog/cows_fly, accessed Mar. 27, 2018, 4 pp.

Lauren Garner, "It's a Flying Cow" AT&T Home/Innovation, Feb. 23, 2017, 3 pp.

* cited by examiner

_US 10,498,566 B2_

SMALL CELL BASE STATIONS HAVING DRONE-MOUNTED RADIO UNITS AND RELATED SYSTEMS AND METHODS

CROSS-REFERENCE TO RELATED APPLICATION

The present application claims priority under 35 U.S.C. § 119 to U.S. Provisional Patent Application Ser. No. 62/478,064, filed Mar. 29, 2017, the entire content of which is incorporated herein by reference.

FIELD

The present invention relates to cellular communications systems and, more particularly, to small cell cellular base stations.

BACKGROUND

Cellular communications systems are well known in the art. In a typical cellular communications system, a geographic area is divided into a series of regions that are referred to as "cells," and each cell is served by a so-called "macrocell" base station. The base station may include baseband equipment, radios and antennas that are configured to provide two-way radio frequency ("RF") communications with mobile and fixed subscribers ("users") that are located throughout the cell. The base station may also have backhaul equipment that enables communications between the base station and the core network of the wireless operator. The antennas are often mounted on a tower or other raised structure, with the radiation beam ("antenna beam") that is generated by each antenna directed outwardly to serve the entire cell or a portion of "sector" of the cell such as a wedge shaped section of the cell in the azimuth plane.

In order to increase capacity, so-called "small cell" cellular base stations have been deployed in recent years. A small cell base station refers to a base station that typically operates at lower power levels and hence has a much smaller coverage area than a typical macrocell base station. Typically, a small cell base station is designed to serve users within a small area, such as, for example, within tens or hundreds of meters of the small cell base station.

Small cell base stations typically employ an antenna that provides full 360 degree coverage (omnidirectional coverage) in the azimuth plane and a suitable beamwidth in the elevation plane to cover the designed area of the small cell. The small cell antenna may be designed to have a small downtilt in the elevation plane to reduce spill-over of the antenna beam of the small cell antenna(s) into regions that are outside the small cell and also for reducing interference between the small cell and the overlaid macrocell.

Small cell base stations may be deployed in a number of different environments. In some cases, small cell base stations are used to provide cellular coverage to high traffic areas within a macrocell, which allows the macrocell base station to offload much or all of the traffic in the vicinity of the small cell to the small cell base station. In other cases, small cell base stations may be deployed within structures such as office buildings, shopping smalls, stadiums and the like to provide coverage within such buildings. Small cell base stations may be particularly effective in this environment as concrete and steel structures may degrade the quality of service within the interior of such buildings when served by a macrocell base station.

Traditional small cell base stations operate in much the same way as a macrocell base station, with each small cell base station including its own baseband equipment, one or more antennas connected thereto (depending upon whether sectorization is used), and its own physical cell identifier and backhaul connection to the core network. This may create difficulties when dense deployment of small cells is required, as might be the case in a downtown urban area. For example, borders between adjacent small cells may experience interference and reduced performance. Hand-offs between small cells can become common, which complicate network control and may negatively impact the user experience. Complex radio planning may also be required to reduce interference between adjacent small cells and between the small cells and nearby or overlaid macrocell base stations.

Enhanced small cell base stations have recently been introduced that can provide improved performance, particularly when dense deployment is required. An example of such an enhanced small cell is the OneCell C-RAN Enterprise Small Cell system sold by CommScope, Inc. of Hickory, N.C., which is referred to herein as the "OneCell system." The OneCell system deploys a plurality of radio units in the area to be served by the small cell, and configures these radio units to operate as a so-called "super cell" so that to the core network the super cell appears like a traditional small cell that has a single physical identifier and a single connection to the core network despite deploying as many as 64 radio units. The OneCell system also uses virtual sectorization within the cell to provide capacity and coverage where it is needed and when it is needed. This approach can provide significantly enhanced data throughputs while simplifying network planning and operation.

SUMMARY

Pursuant to embodiments of the present invention, base station systems are provided that include a central hub having a baseband controller and a backhaul connection to an external network and a plurality of remote units that are connected to the central hub by respective wired power and cabling connections. Each remote unit includes an associated drone unit that has an aerial drone and a radio unit mounted thereon. The radio units are operated under control of the baseband controller to form a super cell that appears as a single base station to the external network.

In some embodiments, the wired power and cabling connections may comprise power-over-fiber cabling connections.

In some embodiments, at least some of the drone units may be connected to their associated remote units by tether cables. In such embodiments, each tether cable may comprise a power-over-fiber tether cable. At least some of the drone units may include a respective media converter that is configured to convert fiber optic data received over the respective power-over-fiber tethers cable into respective Ethernet data that is communicated to the respective radio units via respective Ethernet cables and to convert power signals received over the respective power-over-fiber tether cables into respective Power-over-Ethernet power signals that are supplied to the respective radio units over the respective Ethernet cables.

In some embodiments, at least some of the remote units are powered by respective power cabling connections that extend between the central hub and the respective remote units. In such embodiments, the central hub may include a power supply that adjusts a voltage of a power signal that is provided over a first of the power cabling connections to a first of the remote units in response to variations in the current drawn by the load at the first of the remote units. The voltage of the power signal that is provided over the first of the power cabling connections to the first of the remote units may be adjusted, for example, so that a voltage of the power signal as measured at the first of the remote units remains substantially constant.

In some embodiments, at least some of the remote units may include boost converters and at least some of the drone units may include buck converters.

In some embodiments, a first of the remote units may include an Ethernet switch, and a power-over-fiber cabling connection may extend from the first of the remote units to a second of the remote units.

In some embodiments, at least some of the remote units may include a respective motorized rapid spool system.

In some embodiments, at least some of the remote units may include a respective media converter that is configured to convert fiber optic data received over the respective power-over-fiber cabling connections into Ethernet data that is communicated to the respective radio unit via respective Ethernet cables, where the Ethernet cables are also configured to function as tether cables for the respective drone units.

In some embodiments, the radio units may be mounted on respective aerial drones of the drone units via motorized mounting structures that are configured to change a physical orientation of the radio units.

Pursuant to further embodiments of the present invention, methods of operating a small cell base station are provided in which an RF communication is received from a user at a radio unit that is part of a drone unit that includes an aerial drone having the radio unit mounted thereon. Data contained in the received RF communication is transmitted from the radio unit to a remote unit over a tether cord. The data contained in the received RF communication is then transmitted from the remote unit to a central hub over a power-over-fiber system.

In some embodiments, the electronic equipment in the remote unit may be powered by supplying a power signal to the remote unit over a power cabling connection that extends between the central hub and the remote unit. In such embodiments, the central hub may include a power supply that adjusts a voltage of the power signal in response to variations in the current drawn by the load at the remote unit. The voltage of the power signal that is provided over the power cabling connection to the remote unit may be adjusted so that a voltage of the power signal as measured at the remote unit remains substantially constant.

In some embodiments, the data contained in the received RF communication may be transmitted from the radio unit to the remote unit as a fiber optic signal.

In some embodiments, the drone unit may be powered via a power signal that is supplied to the drone unit from the remote unit over the tether cord, where the remote unit includes a boost converter that steps up the voltage of the power signal to a voltage exceeding 300 volts. In such embodiments, the drone unit may include a buck converter that steps down a voltage of the power signal supplied to the drone unit over the tether cord.

In some embodiments, electronic equipment included in the remote unit may be powered via a power cabling connection that extends between the central hub and the remote unit.

In some embodiments, a plurality of remote units may be connected to the central hub, each remote unit having an associated drone unit with a radio unit mounted thereon, where the radio units all communicate through one or more baseband controllers at the central hub to form a super cell small cell base station.

In some embodiments, the tether cord may include at least two power conductors and at least one fiber optic cable bound in a fiber web. In such embodiments, the tether cord may also include a protective coating that covers the fiber web, and/or where the fiber web may be a Kevlar web.

DETAILED DESCRIPTION

Figure 1A:
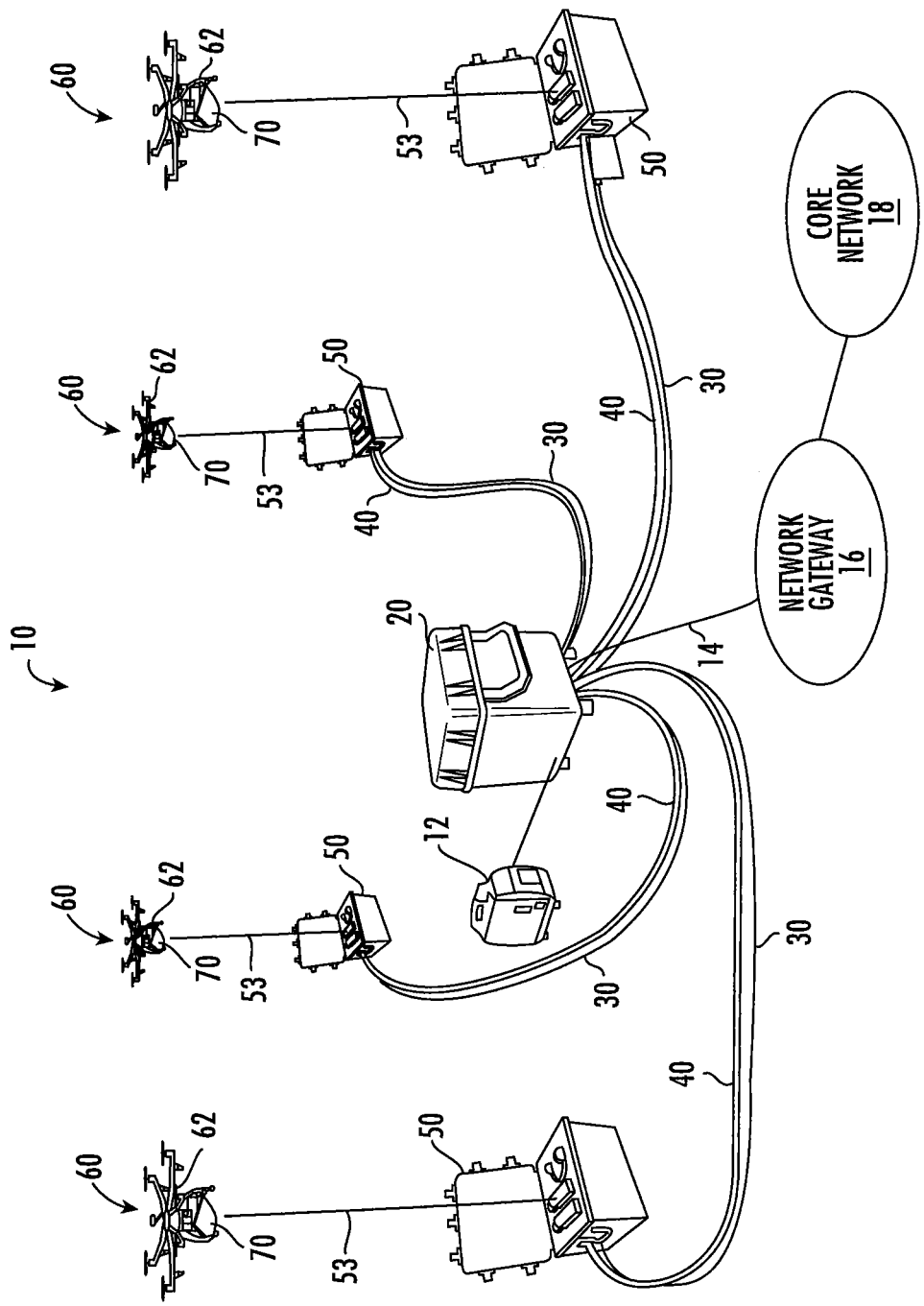
FIG. 1A is a schematic diagram illustrating a drone-enabled small cell base station according to embodiments of the present invention.

Pursuant to embodiments of the present invention, small cell base stations having radio units mounted on unmanned aerial vehicles are provided that may be quickly deployed to provide cellular coverage in a defined area. The unmanned aerial vehicle may comprise any appropriate unmanned flying object onto which a radio unit of a small cell base station may be mounted. Such unmanned aerial vehicles are referred to herein as "aerial drones" or "drones." Small cell base stations that include at least one unmanned aerial vehicle with a radio unit mounted thereon are referred to herein as "drone-enabled small cell base stations." The drone-enabled small cell base stations according to embodiments of the present invention may be ideal for use in emergency situations and/or for special events and various other applications in which it may be necessary or desirable to quickly provide increased cellular coverage and/or to provide cellular coverage for a limited amount of time. The drone-enabled small cell base stations according to embodiments of the present invention deploy one or more aerial drones that each have a radio unit mounted thereon. The combination of an aerial drone and a radio unit is referred to herein as a "drone unit." The radio unit may comprise, for example, a OneCell radio point, a WiFi access point or any other radio unit including a radio and one or more associated antennas that can transmit and receive RF signals. Each drone unit may be flown to a desired height above the ground at a pre-selected position within the coverage area of the small cell. In many cases, the maximum height at which the drone unit may be flown may be limited by regulation. For example, in the United States, Federal Aviation Administration regulations may place a 400 foot maximum flying height on the drone units. Typically, the drone units are spread throughout the geographic region covered by the drone-enabled small cell base station. By mounting the radio units on drones that may be, for example, flown to a height of 100 meters above the ground, the coverage area and/or capacity of the drone-enabled small cell base station may be significantly increased.

The drone-enabled small cell base station may include a central hub. In some embodiments, the drone-enabled small cell base station may further include one or more remote units in the form of ground-based tether boxes. A tether box may be provided for each drone unit and each drone unit may be connected to its respective tether box by a tether cable. The tether cable may carry power, data and/or control signals to the drone unit. One or more data cables and power cables may be connected between the central unit and the ground-based tether boxes to provide power to the drone units and/or to the tether boxes and to carry data between the central hub and the tether boxes/drone units.

In some embodiments, the central hub of the drone-enabled small cell base station may comprise a rugged, hardened case that houses baseband and backhaul equipment, a power supply system, a power-over-fiber system and switching equipment. The central hub may also include one or more external hardened power connectors for power inputs from an external generator or other external power source. The central hub may also include external hardened connectors for connection to a backhaul network and for the cabling connections to the tether boxes. Each tether box may comprises a smaller rugged, hardened case which may include power and data transmission equipment for supporting power and data connectivity with the drone unit.

In some embodiments, each tether box may be powered locally by a generator or an available connection to the power grid. Local powering of the tether boxes may be particularly advantageous when the tether boxes are located at relatively large distances from the central hub, as it may help reduce power losses that occurs in the cabling and avoid the need to run power cables over long distances. In other embodiments, each tether box may be powered via a power cable that extends between the tether box and the central hub (or a power source that is co-located with the central hub). In such embodiments, so-called "PowerShift" techniques for delivering power to the tether boxes may be used which may reduce power losses along the cabling connections. These PowerShift techniques, which will be described in greater detail herein, increase the voltages of the power signals output from the power supply to maintain the voltages of the power signals received at each tether box at, for example, a substantially constant voltage that is near a maximum power supply voltage that the tether box can receive without potentially damaging the electronics included in the tether box.

The OneCell radio points that are mounted on the drone units may be powered from their respective tether boxes by, for example, power-over-fiber cables or Ethernet cables. These cables may also be used to power the aerial drones, at least in some embodiments. The power-over-fiber cable or Ethernet cable may also serve as a tether cable for the drone unit. In embodiments where the OneCell radio points on the drone units are powered by respective power-over-fiber cables, a media converter may be provided in each drone unit. The media converter may convert the power signal that is received over the power-over-fiber cable into a Power-over-Ethernet ("PoE") power signal for powering the radio unit. The media converter also converts the fiber optic data signal that is output from the power-over-fiber cable into an Ethernet data signal that may be transmitted over a copper Ethernet cable. Thus, the media converter may provide the power and data conversions necessary to supply the radio unit with power and data in the correct formats. The aerial drone may also be powered via the power signal output by the media converter or via a separate power signal.

In embodiments where the drones are powered using power-over-fiber cables, each tether box may optionally include a boost converter for increasing the voltage of a power signal delivered from the tether box to the drone unit over the power-over-fiber cable, and each drone unit may include a buck converter for decreasing the voltage of the power signal received at the drone unit. The boost converter may increase the voltage of the power signal to, for example between 300-600 volts AC and the buck converter may reduce the voltage to, for example, about 48 volts DC. By increasing the voltage of the power signal, smaller diameter power conductors may be included in the tether cable in order to decrease the weight of the tether cable.

In an example embodiment, the drone unit may climb to an elevation of about 100 meters and provide coverage for a circular coverage area having a radius of about 300 meters. By deploying multiple drone units with slightly overlapping coverage areas, a "super cell" can be created so that the drone-enabled small cell base station may provide coverage over a significant area. This super cell includes a plurality of distributed radio units that act in a coordinated fashion as a single cell in the cellular network. This approach may, for example, leverage off of the virtual sectorization provided by OneCell radio points to provide a single small cell with improved coverage and capacity that could be quickly deployed and/or deployed on a temporary basis. In other embodiments, traditional small cell base stations, WiFi access points or other technologies may be used to implement a drone-enabled small cell base station.

In other embodiments, media converters may be included in each tether box, and the radio units may be powered over PoE connections carried over respective copper Ethernet tether cables. Such embodiments may be particularly useful in deployments where the drone units are flown at lower heights above the ground, as the increased weight associated with using an Ethernet tether cable may be offset by the decrease in weight resulting from the reduced length of the tether cable required to support drone units flown at lower heights above the ground.

Example embodiments of the invention will now be discussed in more detail with reference to the attached drawings.

FIG. 1A is a schematic diagram of a drone-enabled small cell base station 10 according to certain embodiments of the present invention. As shown in FIG. 1A, the drone-enabled small cell base station 10 includes a central hub 20 and a plurality of tether boxes 50. Each tether box 50 may have an associated drone unit 60. Each drone unit 60 may include an aerial drone 62 that has a radio unit 70 mounted thereon, and may be tethered to a respective one of the tether boxes 50 by a tether cable 53. The tether cables 53 may serve as a transmission path for power and data signals between the tether boxes 50 and their associated drone units 60. Power-over-fiber cables 30 extend between the central hub 20 and each tether box 50. Power cables 40 also extend between the central hub 20 and each tether box 50. A generator 12 may be connected to the central hub 20 and may provide power to the central hub 20. A backhaul connection 14 may connect the central hub 20 to a network gateway 16 of a core network 18 run by a mobile operator.

As the central hub 20 may provide the only connection to the network gateway 16 of the core network 18, data may be transmitted between the radio units 70 and the central hub 20. It is also necessary to power the tether boxes 50 and the drone units 60. As shown in FIG. 1A, in some embodiments, the tether boxes 50 may be powered via the power cables 40 that extend from the central hub 20 to each respective tether box 50. A power supply 25 (see FIG. 2) in the central hub 20 may receive, for example, alternating current ("AC") power from the generator 12 and convert the AC power into DC power signals. These DC power signals may be used to power electronic components in the central hub 20 and to supply power to the respective tether boxes 50 over the power cables 40. AC (as opposed to DC) power signals may be transmitted between the central hub 20 and the tether boxes 50 in other embodiments.

Figure 1B:
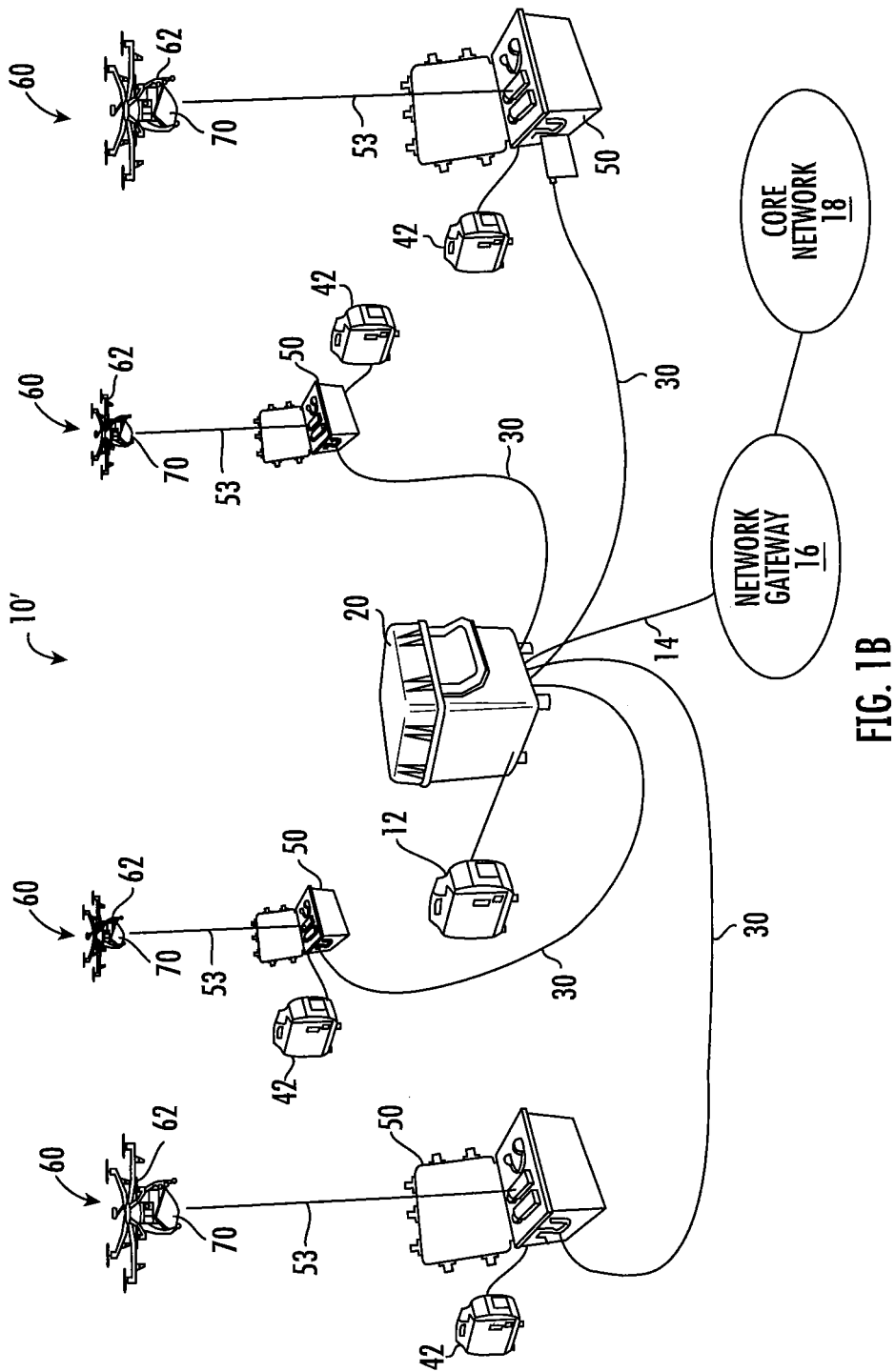
FIG. 1B is a schematic diagram illustrating a drone-enabled small cell base station according to further embodiments of the present invention.

FIG. 1B is a schematic diagram of a drone-enabled small cell base station 10' according to certain embodiments of the present invention. As is readily apparent, the drone-enabled small cell base station 10' of FIG. 1B is similar to the drone-enabled small cell base station 10 of FIG. 1A, except that the power cables 40 are omitted in the drone-enabled small cell base station 10' of FIG. 1B and are replaced with local power sources 42 that are provided at each tether box 50. As the drone-enabled small cell base station 10' of FIG. 1B is otherwise identical to the drone-enabled small cell base station 10 of FIG. 1A, further description thereof will be omitted here.

Figure 2:
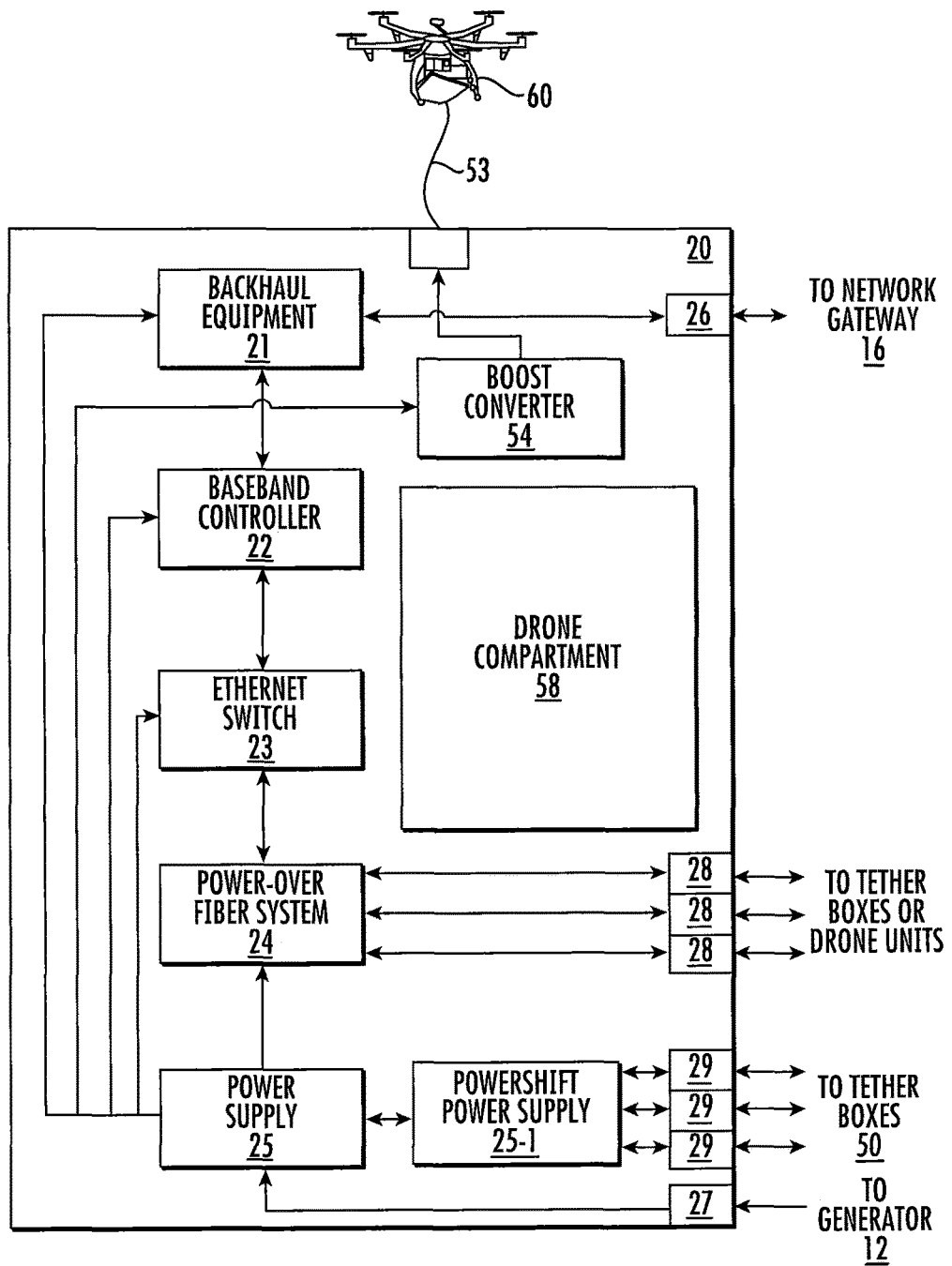
FIG. 2 is a schematic block diagram illustrating a central hub of a drone-enabled small cell base station according to embodiments of the present invention.

FIG. 2 is a schematic diagram illustrating a central hub 20 according to certain embodiments of the present invention. As shown in FIG. 2, the central hub 20 includes backhaul equipment 21, one or more baseband controllers 22, an Ethernet switch 23, a power over-fiber system 24 and a power supply 25 that are mounted within a rugged, hardened case. The hardened case includes a plurality of external hardened connectors including a backhaul connector 26 for connection to the network gateway 16, a power connector 27 that is configured to receive a power cable from the external generator 12 or other external power source, a plurality of power-over-fiber connectors 28 for power-over-fiber cabling connections 30 that extend between the central hub 20 and the tether boxes 50, and a plurality of power connectors 29 that may be used to supply power to the tether boxes 50 in some embodiments over the power cables 40.

The backhaul equipment 21 may be coupled to the baseband controller 22. The backhaul equipment 21 may receive data that is to be transmitted over the drone-enabled small cell base station 10 from the core network 18 via the network gateway 16 and provide this data to the baseband controller 22, and may receive via the baseband controller 22 data that is received by the drone units 60 and transmit this data to the core network 18 via the network gateway 16.

The baseband controller 22 may perform various operations including formatting data for transmission and controlling operation of the radio units 70, as will be described in greater detail below. The baseband unit 22 may be coupled to the power-over-fiber system 24 through an Ethernet switch 23 that performs routing of data packets.

The power-over-fiber system 24 may be used to transmit power signals and data signals from the central hub 20 to the drone units 60 via the tether boxes 50. A respective fiber optic cable 32 and a respective power cable 34 may form a power-over-fiber cabling connection 30 between the central hub 20 and each tether box 50. Each power-over-fiber cabling connection 30 may be implemented as two separate cables or as a single cable. The power-over-fiber cabling connections 30 may be connected to the power-over-fiber system 24 via the connectors 28 and internal cabling in the central hub 20. Power-over-fiber systems such as power-over-fiber system 24 may transmit power and data significantly farther than can be done using, for example, a PoE system, with a range approximately thirty times the distance of standard PoE. A typical composite (i.e., single cable) power-over-fiber cabling connection 30 may include two 12 AWG or 16 AWG stranded power conductors and between one and twelve single mode or multimode optical fibers.

The power supply 25 may receive an external power signal (e.g., from the generator 12 or other local power source) that is input to the central hub 20 via power connector 27 and may convert the external power signal into a suitable format. For example, the external power source may be an AC power source and the power supply 25 may be an AC-to-DC converter that converts the AC signal received from the external power source to a DC power signal. The power supply 25 may include a plurality of outputs that are used to provide power to the backhaul equipment 21, the baseband controller 22, the Ethernet switch 23 and the power-over-fiber system 24. The power supply 25 may also supply power to a PowerShift power supply 25-1 in embodiments where the tether boxes 50 are powered by power cable connections 40 from the central hub 20.

As noted above, the power-over-fiber system 24 outputs respective power signals onto the power-over-fiber cabling connections 30 that extend between the central hub 20 and the respective tether boxes 50. These power signals may or may not use PowerShift techniques. In some embodiments, this power-over-fiber cabling connection 30 may connect to a boost converter in the tether box 50 that significantly increases the voltage of the power signal for delivery from the tether box 50 to the drone unit 60. The boost converter may also convert a received DC power signal into an AC power signal in embodiments where AC power signals are delivered to the drone unit 60. In other embodiments, power-over-fiber cabling connection 30 may connect to a media converter in the tether box 50 that converts optical data into Ethernet signals and converts the power signal into a PoE power signal so that both the power and data can be supplied from the tether box 50 to the drone unit 60 over a copper Ethernet cable. In either embodiment, an Ethernet switch may be included in at least some of the tether boxes 50 so that a "tree" architecture may be used where only a few of the tether boxes 50 connect directly to the central hub 20, and the remaining tether boxes 50 connect to the central hub 20 through intervening tether boxes 50. The Ethernet switches are used to route the data to the correct tether box 50. The use of a tree architecture may reduce the amount of cabling required, which may be particularly beneficial here as the cabling often is not buried and hence more susceptible to damage during use.

Mounting the media converters on the drone units 60 (as opposed to mounting them in the tether boxes 50) may be advantageous because it allows routing the power-over-fiber cabling connections all the way from the central hub 20 to the drone units 60. A power-over-fiber cable may be significantly lighter than a corresponding copper Ethernet cable, as the power-over-fiber cables may only have two conductors as opposed to the eight conductors included in copper Ethernet cables. The ability to use a lighter tether cable 53 may be a significant advantage, because aerial drones 62 have payload limits, and typically the expense of the drone unit 60 increases with increasing supported payload. Thus, by decreasing the weight of the tether cable 53, it may be possible to reduce the cost of the drone unit 60, fly the drone unit 60 at higher altitudes (i.e., use longer tether cables 53, although in many cases there may be a maximum allowable altitude such as 400 feet) and/or increase the weight of the radio unit 70. Additionally, when a power-over-fiber tether cable 53 is used, buck-boost power conversion may be performed so that higher voltage/lower current power signals may be used that may be carried on smaller power conductors, further decreasing the weight of the tether cable 53.

The central hub 20 may optionally include an associated drone unit 60 that may be flown above the central hub 20 and tethered to the central hub 20 by a tether cable 53. In such embodiments, the central hub 20 may also include a drone compartment 58, a boost converter 54 and/or a media converter 52. These elements are discussed in more detail below with reference to FIG. 3A. In these embodiments, the central hub 20 effectively includes some or all of the functionality of a tether box 50.

As shown in FIG. 2, in embodiments of the present invention that include PowerShift capabilities, the central hub 20 may further include a second power supply 25-1 that is configured to set the voltages of the DC power signals output from the central hub 20 to the tether boxes 50 at desired levels. The second power supply 25-1 may comprise, for example, a DC-to-DC power supply that receives one or more DC power signals having relatively constant voltages from the first power supply 25. The second power supply 25-1 may have a plurality of output ports that are connected to the respective tether boxes 50 via the power connectors 29 and the power cables 40 (see FIG. 1A). The DC power signal that is output at each output port of the second power supply 25-1 may have a voltage level that varies in response to the load connected at the far end of the power cabling connection 40. In particular, the voltage of each DC power signal output from the second power supply 25-1 may vary so that the voltage of the DC power signal that is received at each respective load may remain substantially constant. These substantially constant voltages may be voltages that are near the maximum specified voltage for the respective load equipment (e.g., the maximum specified voltage minus a pre-selected margin).

As is explained, for example, in U.S. Patent Publication No. 2015/0234399, filed May 1, 2015 (herein the '399 publication"), a DC power signal experiences a voltage drop as it traverses a cabling connection between a power supply and a load. The magnitude of the voltage drop depends on the current drawn by the load and the resistance of the power cabling connection. As is further explained in the '399 publication, the magnitude of the voltage drop may be reduced by increasing the voltage of the power supply signal, as the increase in voltage results in a corresponding decrease in the current, and hence a corresponding decrease in the voltage drop. If a voltage drop is high enough, the voltage of a power signal will be insufficient to power the electronic equipment that comprises the load. The second power supply 25-1 may output respective power supply signals that have voltages that ensure that the power supply signals that are received at the respective loads at the far end of the power cabling connections 40 have a substantially constant voltage level that is near the maximum voltage that may be supported by the respective loads. In this fashion, the voltage drop along the power cabling connections 40 may be reduced, which may allow for longer power cabling connections 40. This technique also advantageously reduces the power loss in the cabling connections 40, and hence may reduce operating costs. It will be appreciated that any and all of the PowerShift techniques that are described in the '399 publication may be used to supply power from the central hub 20 to the tether boxes 50, specifically including the various techniques disclosed for determining the resistance of the power cabling connection and/or for dynamically varying the voltage of the power signal output by the second power supply 25-1 to maintain the voltage of the power supply signal at the load at the substantially constant level. These same PowerShift techniques may also be used on the power-over-fiber cabling connections 30 by incorporating a PowerShift power supply (such as power supply 25-1) into the power-over-fiber system 24. The entire content of the '399 publication is incorporated herein by reference as if set forth in its entirety.

Figure 3A:
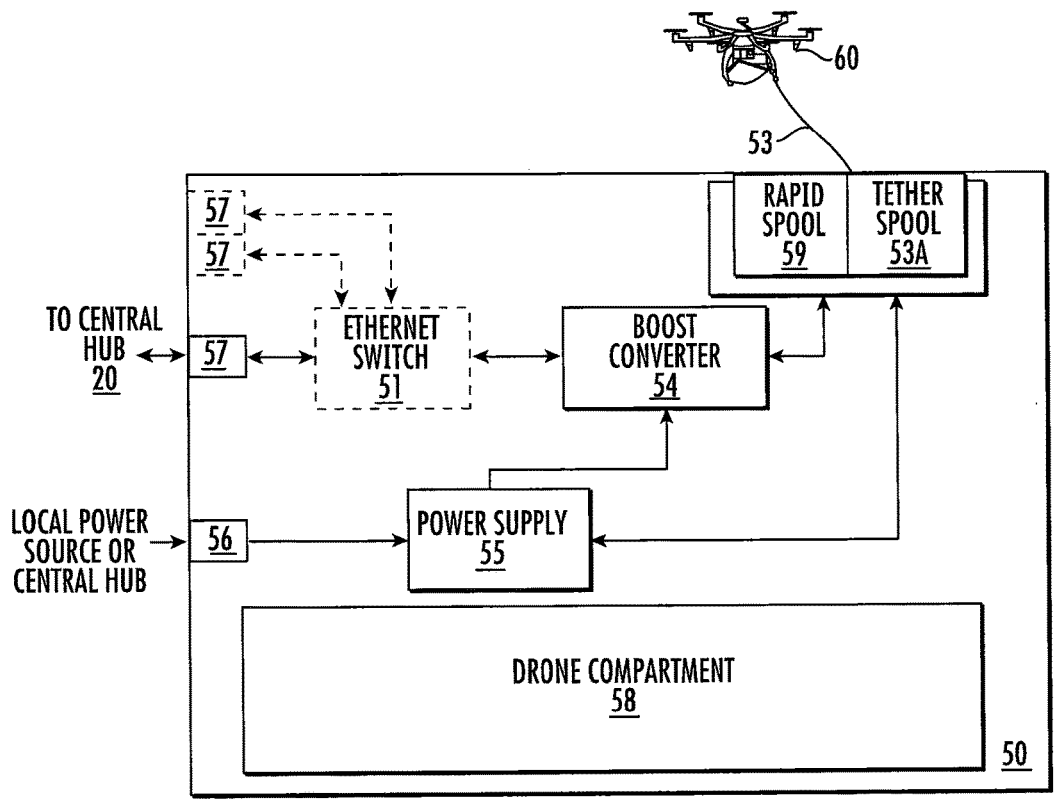
FIG. 3A is a schematic block diagram illustrating a remote unit in the form of a tether box of a drone-enabled small cell base station according to embodiments of the present invention.

FIG. 3A is a schematic diagram illustrating a tether box 50 according to certain embodiments of the present invention. As shown in FIG. 3A, the tether box 50 may include a power supply 55, a boost converter 54, a rapid spool system 59 and a drone compartment 58. The tether box 50 may also include a tether spool 53A and a tether cable 53 that may be wound and unwound from a tether spool 53A. The tether cable 53 is used to provide power to the associated drone unit 60 and to provide a data transmission path between the drone unit 60 and the tether box 50. The power supply 55 may be omitted or replaced with a power converter and/or a power distribution system in some embodiments where the tether box 50 is locally powered. The tether box 50 may also include an Ethernet switch 51 that allows the power-over-fiber cabling connection to be set up in a tree architecture as noted above. Operation of the Ethernet switch 51 (if included) is described below with respect to the tether box 50' of FIG. 3B and since the operation is the same in each embodiment further description of the Ethernet switch 51 will be omitted here. The above-described equipment may be mounted in a rugged, hardened case that typically is smaller than the case of the central hub 20. The case may include hardened external connectors including a power connector 56 that is configured to receive a power cable 40 from the central hub 20 or a power cable from a local power source. The power connector 56 may be connected to the power supply 55 (or power converter/power distribution system) via an internal power cable. The hardened case may also include a power-over-fiber connector 57 that receives the power-over-fiber cabling connections 30 from the central hub 20.

The power supply 55 may be used to power the internal electronic components of the tether box 50, specifically including the motorized tether spool 53A and the boost converter 54. The rapid spool system 59 may be used to rapidly un-spool the power-over-fiber cables 30 and/or the power cables 40 that connect the tether box 50 to the central hub 20. For example, the tether box 50 may be loaded on an all-terrain vehicle and driven from the site of the central hub 20 to a selected location for deployment of the tether box 50 while using the rapid spool system 59 to un-spool the power-over-fiber cables 30 and the power cables 40. In this manner, the cabling connections between the central hub 20 and the tether box 50 may be deployed quickly and efficiently at the same time the tether box 50 is deployed. The motorized tether spool 53A may support the payout and retracting of the tether cable 53. Tether spool 53A may be equipped with swiveling connectors for both fiber and copper connections with the boost converter 54 and the fiber cable 30. In embodiments where the tether cable 53 is a power-over-fiber cable, the tether cable 53 may include one or more strength members such as Kevlar fibers to protect the optical fibers against damage during the spooling and unspooling operations.

The power supply 55 may also be used to power a boost converter 54. The boost converter 54 may significantly step-up the voltage of the power signal received over the power-over-fiber cable 30 at connector 57 so that a very high voltage power signal is transmitted from the tether box 50 to the drone unit 60 over the tether cable 53. For example, the boost converter 54 may increase the voltage of the power signal received over the power-over-fiber cable 30 to between 300-600 volts AC in some embodiments. This increase in voltage decreases the power signal current carried on tether cable 53, which advantageously allows for the use of smaller power conductors in the power cable portion of tether cable 53, thereby decreasing the weight of the tether cable 53.

The hardened case may include a removable or hinged top in some embodiments and may include a compartment 58 for housing the drone unit 60 when the drone unit 60 is not in use. Additionally, while not shown in FIG. 3A, the tether box 50 may include a controller that may be used to control operation of the aerial drone 62 included in the drone unit 60. This controller may comprise, for example, a wireless controller, or may also send control signals over the tether cable 53 (either over the power conductors thereof or over a separate control wire).

Figure 3B:
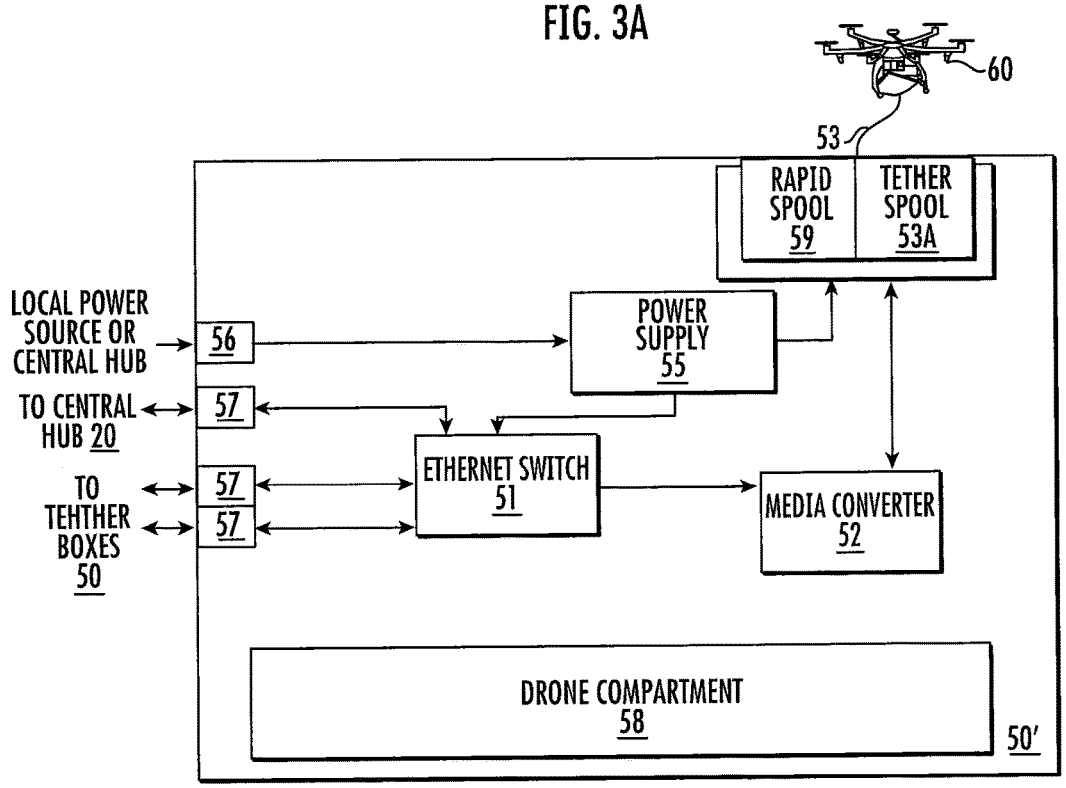
FIG. 3B is a schematic block diagram illustrating a tether box of a drone-enabled small cell base station according to further embodiments of the present invention.

FIG. 3B is a schematic diagram illustrating an alternative tether box 50' according to further embodiments of the present invention. The tether box 50' is similar to the tether box 50. As shown in FIG. 3B, the tether box 50' further includes an Ethernet switch 51 and a media converter 52. The Ethernet switch 51 may be provided so that the central hub 20 can forward data for a plurality of different tether boxes to the tether box 50'.

The fiber optic portion of the power-over-fiber cable 30 may be connected via a connector 57 and an internal cable to the Ethernet switch 51. The Ethernet switch 51 may receive data over this connection and may route that data either to the drone unit 60 associated with tether box 50' or to a respective one of the output connectors 57 for delivery to a different tether box (not shown). The Ethernet switch 51 may route the data based on header information in the individual data packets. As discussed above, the tether box 50 of FIG. 3A likewise may include an Ethernet switch 51 and output connectors 57 so that the tether box 50 may likewise be deployed in a tree architecture. This is shown in FIG. 3A with dashed lines and boxes. As discussed above, this approach may be used so that the tether boxes may be deployed in a tree architecture in order to reduce the number of power-over-fiber cables 30 that need to extend all the way to the central hub 20.

Data packets addressed to radio units 70 associated with other tether boxes 50, 50' are routed by the Ethernet switch 51 to the appropriate output connectors 57 for delivery to the other tether boxes 50, 50'. Data packets addressed to the radio unit 70 on the drone unit 60 associated with tether box 50' are passed from Ethernet switch 51 to a media converter 52. The power conductors of the internal cable connected to input connector 57 are also passed to media converter 52. The media converter 52 converts the fiber optic data signals that are input thereto into data signals suitable for transmission over a copper Ethernet cable such as, for example, a Cat 5e or Cat 6 four-pair Ethernet cables, and converts the power signals input thereto into PoE signals that are carried over the same cable. The tether cable 53 may in such embodiments comprise an Ethernet cabling connection that extends between the media converter 52 and the drone unit 60. Since a PoE power signal is provided over the tether cable 53 in this embodiment, the boost converter 54 of drone unit 50 may be omitted in drone unit 50'. In this case, the drone unit 60 may, for example, be powered by another means (e.g., a battery, a gasoline engine, etc.), powered by separate power conductors that may be provided in the tether cable 53 and powered from the power supply 55, or powered by the PoE power signal. In embodiments where power leads separate from the four twisted pairs of conductors of the Ethernet cable are provided, the boost converter 54 may be included in the tether box 50' between the power supply 55 and the tether spool 53A and a buck converter may be included in the drone unit 60 so that a high voltage, low current power signal may be supplied over the tether cable 53 to power the drone unit 60. If such separate power leads are provided for powering the drone unit 60, they may be included within the jacket of the Ethernet tether cable 53 or may be part of a separate cable that may be twisted together with the Ethernet tether cable 53 and/or enclosed in a common outer jacket with the Ethernet tether cable 53.

Figure 4:
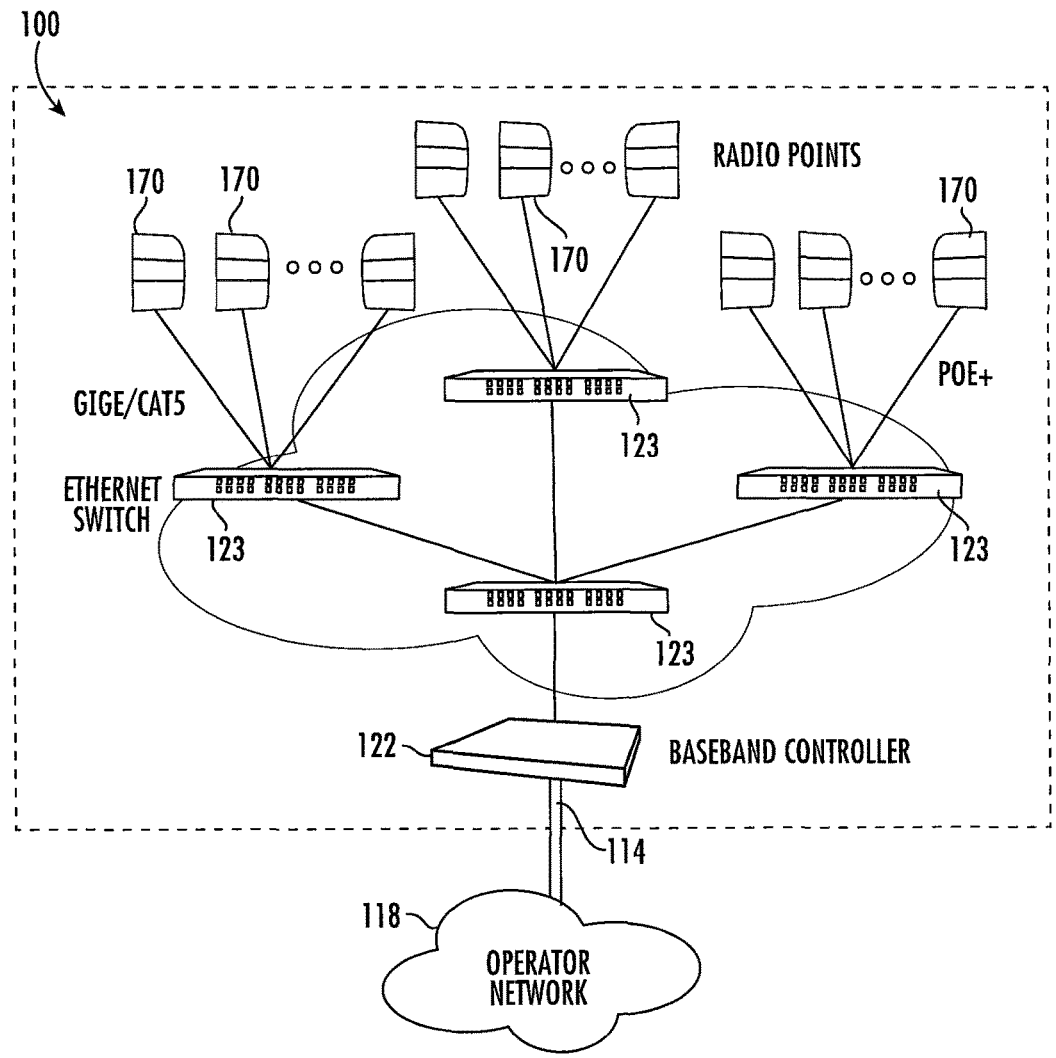
FIG. 4 is a schematic block diagram illustrating a super cell architecture that can be employed in the drone-enabled small cell base stations according to certain embodiments of the present invention.
Figure 5:
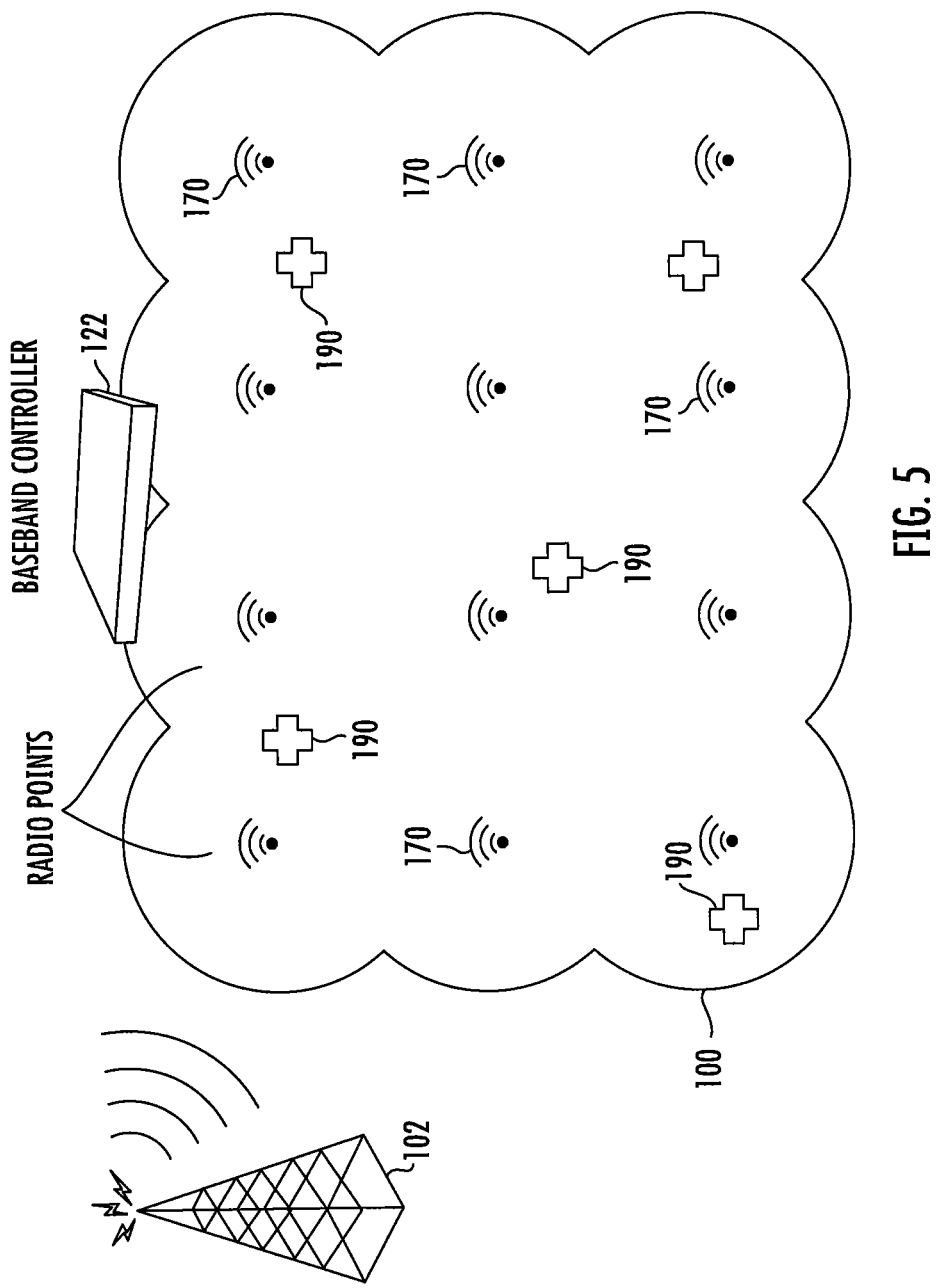
FIG. 5 is a schematic diagram that illustrates operation of the super cell of FIG. 4.

As noted above, in some cases the drone-enabled small cell base stations according to embodiments of the present invention may be implemented using OneCell systems. Before describing such embodiments, it is helpful to explain the design and operation of an example OneCell system. The description of the OneCell system below will use reference numerals that are similar to the reference numerals used in FIGS. 1A-3B (they are all incremented by 100) to identify the corresponding elements of the OneCell system for clarity. FIGS. 4 and 5 below schematically illustrate the architecture and operation of an example OneCell system.

A small cell base station that is implemented using a OneCell system includes a plurality of radio units 170 that are referred to as "radio points." Each radio point 170 may comprise a radio 172 and one or more associated antennas 174 that can transmit RF signals to users and receive RF signals from users. One or more baseband controllers 122 may be provided that are connected via a backhaul link 114 to a core network 118. Each baseband controller 122 may support up to 64 radio points and up to 1024 connected users. Total throughput of 600 Mbps is supported. The baseband controller 122 is connected to one or more Ethernet switches 123. These Ethernet switches 123 connect to the radio points 170 over Ethernet cabling connections.

In the OneCell system, the radio points 170 are designed to operate in a coordinated fashion to form a so-called "super cell" 100. The super cell 100 appears as a single cell to the core network 118, even though the super cell 100 may include as many as sixty-four radio points 170. Moreover, since the super cell 100 operates as a single cell, there are no handoffs as users move within the super cell 100, which may significantly improve the user experience. Since the core network 118 only requires a single connection to the super cell 100 and may treat the super cell 100 as a single cell, the super cell design may easily be integrated into the core network 118. This may be important when deploying the drone-enabled small cell base stations according to embodiments of the present invention in, for example, emergency situations, as it may allow for much quicker deployment.

The super cell 100 may employ virtual sectorization with smart frequency reuse to provide capacity within the super cell 100 where it is most needed at any given time. Moreover, the super cell 100 may be within a footprint of a macrocell 102 that is also connected to the core network 118 and may fully co-exist with the macrocell 102. The super cell 100 is also easily scaled for capacity by adding additional radio points 170 (e.g., up to 64 radio points 170 per super cell 100) and, if needed, additional super cells 100 may be deployed to further increase capacity. Within the super cell 100, no handovers between users may be needed, although handovers may occur between the baseband controllers 122 since multiple baseband controllers 122 (e.g., two) may be deployed in some cases. However, such handoffs may be controlled with tightly coordinated scheduling so that they are seamless and the two baseband controllers 122 may appear to act as a single baseband controller 122. The super cell 100 may employ a cellular radio access network (C-RAN) over Ethernet architecture where the radio points 170 are connected to the baseband controller 122 over Ethernet connections.

Referring now to FIG. 4, the architecture of a simplified super cell 100 will be discussed. As shown in FIG. 4, a baseband controller 122 of the super cell 100 is connected to the core cellular network 118 via, for example, a wired or wireless backhaul link 114. The baseband controller 122 may be connected to the radio points 170 over an Ethernet local area network. As shown in FIG. 4, a first Ethernet switch 123 which has fiber optic outputs may be coupled to the baseband controller 122. A plurality of additional Ethernet switches 123 may be provided in the vicinity of the radio points 170. The Ethernet switch 123 may form an Ethernet local area network that has a tree architecture, where the first Ethernet switch 123 that connects to the baseband controller 122 forms a first or "root" level. This "root" Ethernet switch 123 then feeds several additional Ethernet switches 123 that form a first "branch" level of the architecture. Each of the Ethernet switches 123 in the first branch level may then connect to one or more radio points 170. Thus, in the simple example of FIG. 4, each radio point 170 is connected to the baseband controller 122 through a pair of Ethernet switches 123. While in the particular embodiment of FIG. 4 only a single branch level is shown, it will be appreciated that additional branch levels of Ethernet switches 123 may be provided, particularly in the case where a large number of radio points 170 are deployed. It will also be appreciated that different radio points 170 may be connected to the baseband controller 170 though different numbers of Ethernet switches 123, and that the root Ethernet switch 123 may have radio points 170 connected directly thereto.

Each radio point 170 may be designed to be fed by a copper Ethernet cable that powers the radio point 170 via PoE and that also carries data between the radio point 170 and the baseband controller 122. The Ethernet switches 123 in the first branch level of the local area network may receive the fiber optic cables from the Ethernet switch 123 in the root level of the network. Media converters (not shown separately as they can be incorporated into the Ethernet switches 123 in some embodiments) may be provided that convert the fiber optic data into Ethernet RF signals. The media converters may connect to individual radio points 170 over respective copper Ethernet cabling connections. The media converters may also inject PoE power signals onto the copper Ethernet cables or convert power signals carried along with the fiber optic data signals into PoE power signals to provide PoE power signals that are used to power the respective radio points 170.

Each radio point 170 may comprise, for example, a multiband radio 172 (see FIGS. 6A-6B) that transmits and receives RF signals in two or more frequency bands. Each radio point 170 may include, for example, two antennas 174-1, 174-2 (collectively, antennas 174) (see FIGS. 6A-6B) so that each radio point 170 may implement 2×2 multi-input-multi-output ("MIMO"). As known to those of skill in the art, MIMO refers to a technique where a signal is output through multiple ports of a radio and transmitted through multiple different antennas that are, for example, spatially separated from one another and/or at orthogonal polarizations. The amplitudes and phases of the signals transmitted through the different ports may be set so that the signals transmitted through the multiple antennas will constructively combine at the user device. The use of MIMO transmission techniques may help overcome the negative effects of multipath fading, reflections of the transmitted signal off of buildings and the like to provide enhanced transmission quality and capacity.

Figure 6A:
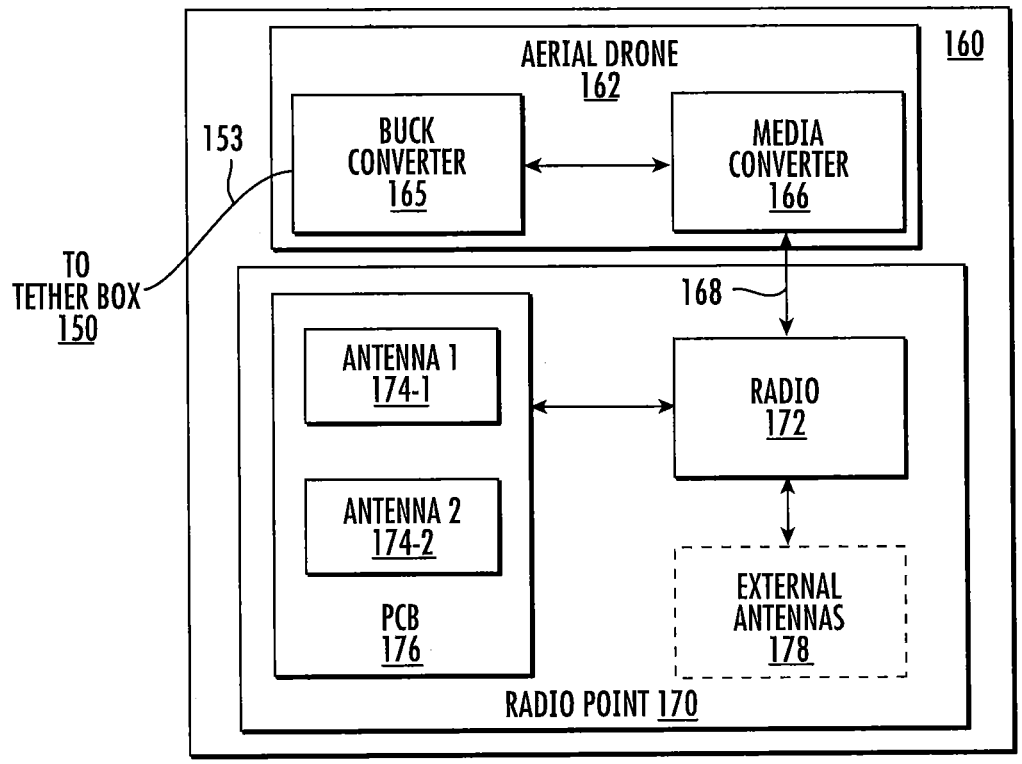
FIG. 6A is a schematic block diagram illustrating a drone unit according to certain embodiments of the present invention.
Figure 6B:
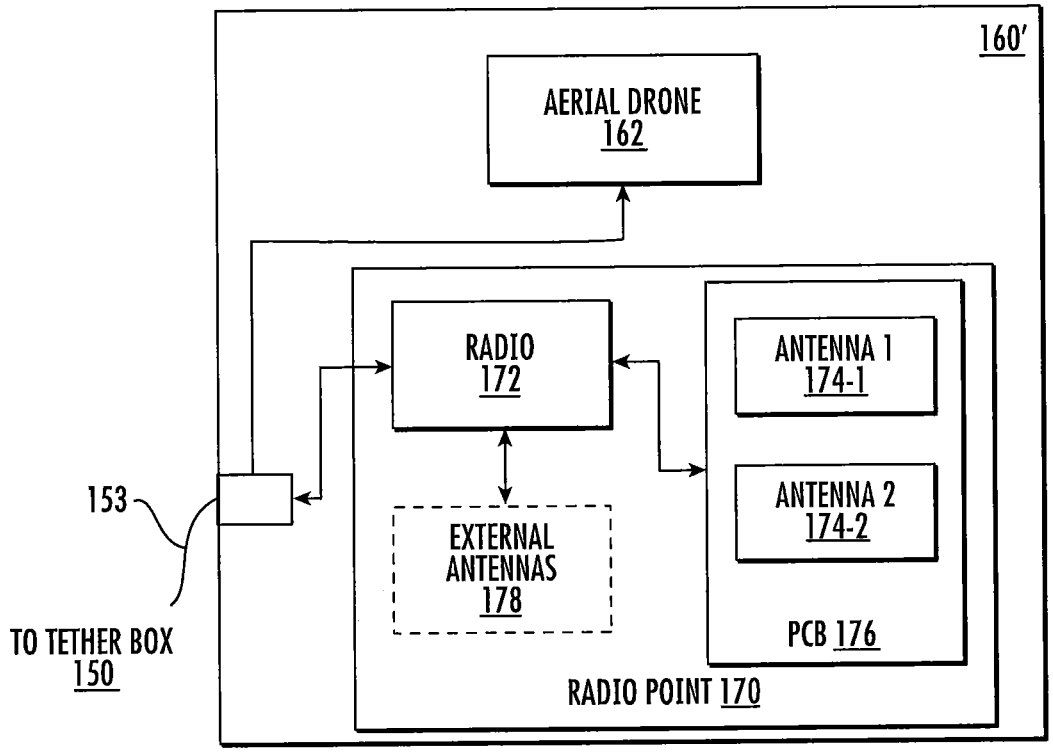
FIG. 6B is a schematic block diagram illustrating a drone unit according to further embodiments of the present invention.

The antennas 174 included on each radio point 170 may be printed circuit board ("PCB") mounted antennas that are mounted on a single PCB 176 (see FIGS. 6A-6B). The internal antennas 174 on a radio point 170 may be used implement 2×2 MIMO. As will be discussed in greater detail herein, two radio points 170 can act together to support 4×2 or 4×4 MIMO on the downlink from the radio points 170 to user devices. Each antenna 174 may be a multiband antenna that supports communications in multiple 5-20 MHz bands. The radio points 170 may also include one or more connectors that may connect to external antennas, such as conventional 4.3-10 coaxial connectors. One or more higher performance antennas 178 that are external to the radio point 170 may then be used instead of the internal antennas 174, as will be discussed in more detail below. Each radio point 170 may be powered by a PoE connection so that both the power and data may be provided to the radio point 170 over a single Ethernet cabling connection.

FIG. 5 is a schematic diagram that illustrates operation of the super cell 100. As shown in FIG. 5, the super cell 100 is formed within a portion of a coverage area of a macrocell 102. The super cell 100 is implemented using a plurality of radio points 170 that may be geographically distributed throughout the super cell 100. The super cell 100 has a single physical cell identification. The super cell 100 uses coordinated scheduling and pooled capacity to provide enhanced throughput and performance. In an example embodiment, the baseband controller 122 may assign frequencies to users 190 on a time slot-by-time slot basis (e.g., every millisecond). Multiple users may transmit or receive signals at the same frequency during the same time-slot.

The radio points 170 may have overlapping coverage areas so that multiple radio points 170 may provide coverage to a given user 190. Borders do not need to be created between individual radio points 170. This may be particularly advantageous when the super cell 100 is installed for temporary or emergency situations as network planning need not be performed to avoid interference between adjacent radio points 170. Joint downlink transmission may be performed where multiple radio points 170 are used to transmit an RF signal to a given user 190. The use of joint downlink transmission techniques may provide improved link budgets. Likewise, multiple radio points 170 may be used to receive a signal from a given user 190. Such joint reception allows for multi-radio point interference rejection that may be performed, for example, in the baseband controller 122. For example, in some embodiments, up to eight radio points 170 may receive a signal from a user and the baseband controller 122 may combine these received signals using interference rejection combining. This may be helpful, for example, in suppressing interference from users of the macrocell 102 that are far from the macrocell 102 and transmitting at higher power levels since spatial diversity techniques may be used to help suppress interference from the macrocell 102 or a user transmitting to the macrocell base station.

The super cell 100 may use virtual sectorization to provide capacity anywhere within the coverage area 104 of the super cell 100 where the capacity is required. Since capacity can be dynamically allocated throughout the super cell 100, there are no handoffs within the super cell 100. The radio points 170 operate under the control of the baseband controller 122, and the baseband controller 122 performs scheduling for all of the radio points 170.

FIG. 6A is a schematic diagram illustrating a drone unit 160 according to certain embodiments of the present invention. As shown in FIG. 6A, the drone unit 160 includes an aerial drone 162 and a radio unit 170. The radio unit 170 may comprise a OneCell radio point. A tether cable 153 that connects to a tether box 150 (not shown) is attached to the aerial drone 162. The tether cable 153 may comprise a power-over-fiber cable. In the particular embodiment shown, the tether cable 153 connects to a buck converter 165. The buck converter 165 may be used to step-down the voltage of the power signal carried on the power-over-fiber tether cable 153 to a suitable voltage. The power supply signal carried over the tether cable 153 may be an AC power signal in some embodiments, and the buck converter 165 may both step-down the voltage of this power signal and convert the AC power signal into one or more DC power signals. The buck converter 165 may supply a stepped-down DC power signal to a media converter 166 that is mounted on the drone 162 for powering the radio point 170, and may also provide a DC power signal to the aerial drone 162 for powering the aerial drone 162. While not explicitly depicted in FIG. 6A, the fiber optic portion of the tether cable 153 may bypass the buck converter 165 to connect directly to the media converter 166. The drone unit 160 may further include a backup battery (not shown) that is coupled to the aerial drone 162 that may provide power to the aerial drone 162 in the event that the power signal provided over the tether cable 153 is disrupted. The backup battery may provide power for safely landing the drone unit 160 under such conditions.

The media converter 166 may convert the fiber optic data signals into electrical signals in a format suitable for transmission over a copper Ethernet cable. The media converter 166 may also convert the power signal output by the buck converter 165 into a PoE power signal. A short copper Ethernet cable (e.g., a Category 5e, Category 6 or Category 6A RJ-45 cable) 168 may connect the media converter 166 to the radio point 170.

The radio point 170 includes a radio 172 and first and second antennas 174. Each antenna 174 may have a hemispherical antenna pattern in some embodiments. The antennas 174 may be mounted on a PCB 176. The radio 172 may also be mounted on the PCB 176 in some embodiments. The radio point 170 may be mounted on the underside of the aerial drone 162 so that the antennas 174 on the radio point 170 may generate, for example, a downwardly pointing hemispherical antenna pattern. As is also shown in FIG. 6A, some or all of the radio points 170 may have one or more external antennas 178 mounted thereon or mounted on the drone 162 adjacent the respective radio points 170. The external antennas 178 may be connected to the respective radio point 170 via, for example, short coaxial cables that connect to external connectors on the radio point 170. These external antennas 178, when connected, may be used in place of the internal antennas 174. The external antennas 178 may be higher performance antennas that perform enhanced beam pattern shaping to increase the antenna gain and reduce interference outside the coverage area of the drone-enabled small cell base station.

FIG. 6B is a schematic diagram illustrating a drone unit 160' according to further embodiments of the present invention. The drone unit 160' is similar to the drone unit 160 described above with reference to FIG. 6A, except that the drone unit 160' omits the media converter 166 and the buck converter 165. The drone unit 160' may be used in embodiments where the tether cable 153 is a copper Ethernet cable that carries a power signal for powering the radio point 170 along with integrated or separate power leads that are used to power the aerial drone 162. As shown in FIG. 6B, in this case, the power leads in the tether cable 153 may feed power signals to the aerial drone 162 and the Ethernet cable may power the radio point 170. Like the drone unit 160, the drone unit 160' may include a backup battery (not shown) that is coupled to the aerial drone 162 that may provide power to the aerial drone 162 in the event that the power signal provided over the tether cable 153 is disrupted. The drone unit 160' is somewhat simpler than the drone unit 160. However, typically the copper Ethernet tether cable 153 required for drone unit 160' will be heavier than the power-over-fiber tether cable 153 used with drone unit 160. As such, drone unit 160' may be particularly well-suited for installations where the drone units are flown at lower altitudes, such as within structures such as stadiums, convention centers and the like.

Figure 7:
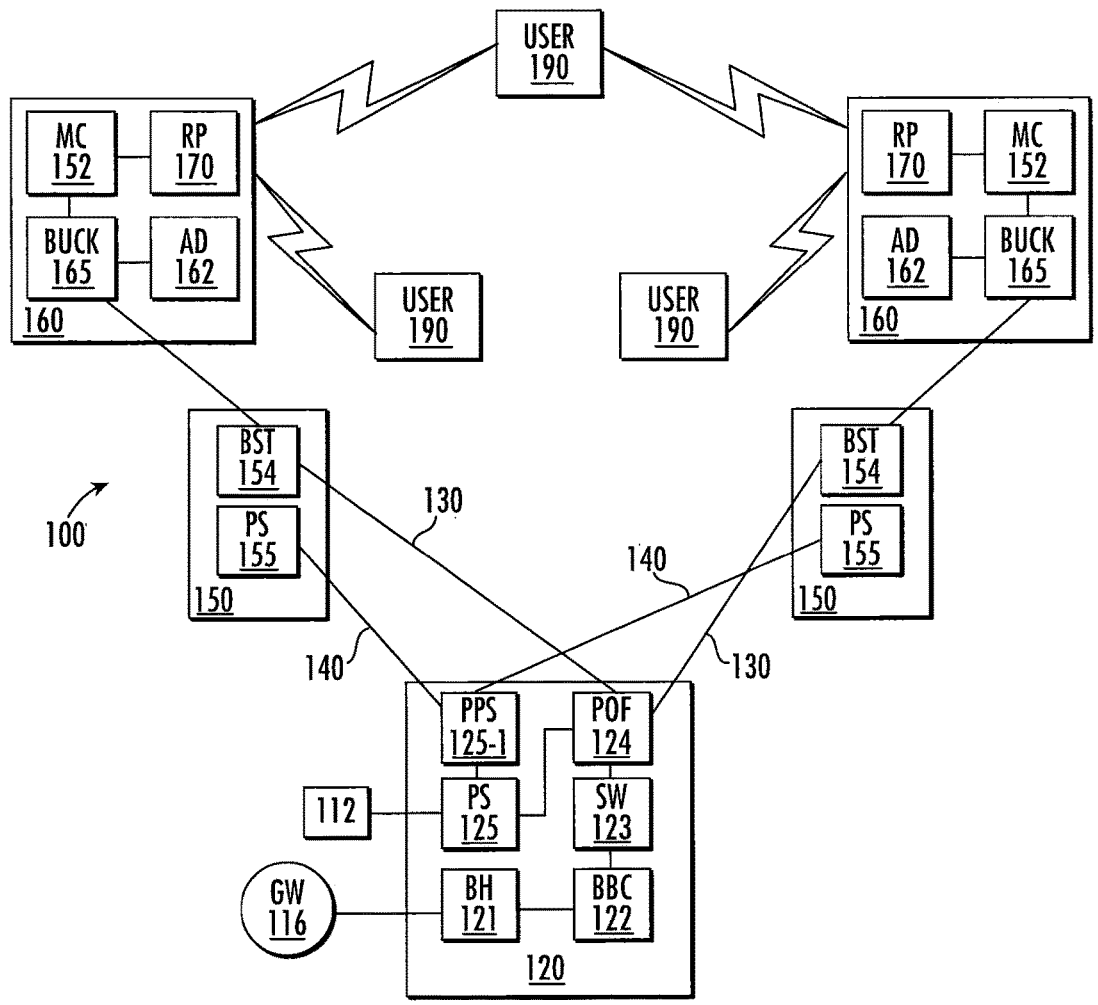
FIG. 7 is a schematic block diagram illustrating a OneCell system based drone-enhanced small cell base station according to embodiments of the present invention.

Referring now to FIG. 7, a OneCell-based, drone-enabled small cell base station that forms a super cell 100 is schematically illustrated. As shown in FIG. 7, the central hub 120 includes backhaul equipment (BH) 121, a baseband controller (BBC) 122, an Ethernet switch (SW) 123, a power over-fiber system (POF) 124, a first power supply (PS) 125 and a second PowerShift power supply (PPS) 125-1.

Data may be received from a core network via a gateway (GW) 116 at backhaul equipment 121. The data is passed to the baseband controller 122 for processing, and then routed via the Ethernet switch 123 to an appropriate power-over-fiber cabling connection 130 of power-over-fiber system 124. The power supply 125 receives power from an external source 112 and converts the received power into forms appropriate for powering components in the central hub 120. The power connections from the power supply 125 to the other components of the central hub 120 that are used to power those other components are omitted in FIG. 7 to simplify the drawing. The power supply 125 also outputs power signals that are routed to the power-over-fiber system 124. The data and power signals that are routed to the power-over-fiber system 124 may be carried from the central hub 120 to the tether boxes 150 over the power-over-fiber cabling connections 130.

The power supply 125 also outputs one or more power signals to the PowerShift power supply 125-1. As described above, the PowerShift power supply 125-1 generates power signals having voltages that are dynamically adjusted so that the voltage of the power signals received at the respective endpoint devices may be substantially constant and near the maximum power supply voltage limits of the respective endpoint devices. The PowerShift power supply 125-1 provides such PowerShift power signals to the tether boxes 150 over power cabling connections 140.

The tether boxes 150 each include a power supply (PS) 155 that receives power form the central hub 120 over a respective one of the power cabling connections 140. As noted above, the power supply 155 may be omitted when the tether boxes 150 have local power sources. Each tether box 150 also has a boost converter (BST) 154 that receives a power signal for powering its respective drone unit 160 over a power-over-fiber cabling connection 130. The power supply 155 may power the boost converter 154. Each boost converter 154 may step-up the voltage of the power signal received from its associated power-over-fiber cabling connection 130 and deliver this power signal with the stepped-up voltage to its respective drone unit 160.

Each drone unit 160 is powered via a power-over-fiber tether cable 153 that extends between the drone unit 160 and its associated tether box 150. The tether cable 153 may connect to a buck converter (BUCK) 165 on the drone unit 160 that steps-down the voltage of the received power signal. This stepped-down voltage may be used to power the aerial drone (AD) 162, and may also be passed to a media converter (MC) 152. The fiber optic portion of the tether cable 153 may also connect (directly or indirectly) to the media converter 152. The media converter 152 may convert the fiber optic data and received power into Ethernet data signals and a PoE power signal that are provided from the media converter 152 to the radio point (RP) 170 over a short Ethernet cable.

The radio points 170 may communicate with users 190 within the super cell in the manner discussed above with reference to FIGS. 4 and 5. As shown in FIG. 7, more than two radio points 170 may transmit and/or receive signals from individual users 190.

Figure 9:
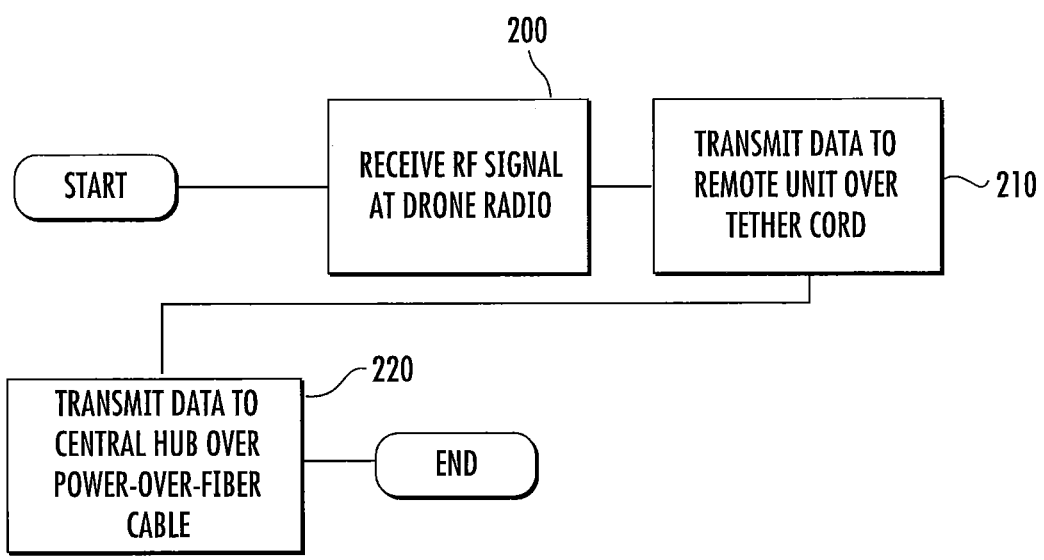
FIG. 9 is a flow chart illustrating a method of operating a small cell base station according to embodiments of the present invention.

FIG. 9 is a flow chart illustrating a method of operating a small cell base station according to embodiments of the present invention. As shown in FIG. 9, an RF communication may be received from a user at a radio unit that is part of a drone unit that includes an aerial drone having the radio unit mounted thereon (Block 200). The data contained in the received RF communication may be transmitted from the radio unit to a remote unit over a tether cord (Block 210). The data contained in the received RF communication may then be transmitted from the remote unit to a central hub over a power-over-fiber system (Block 220).

Figure 8:
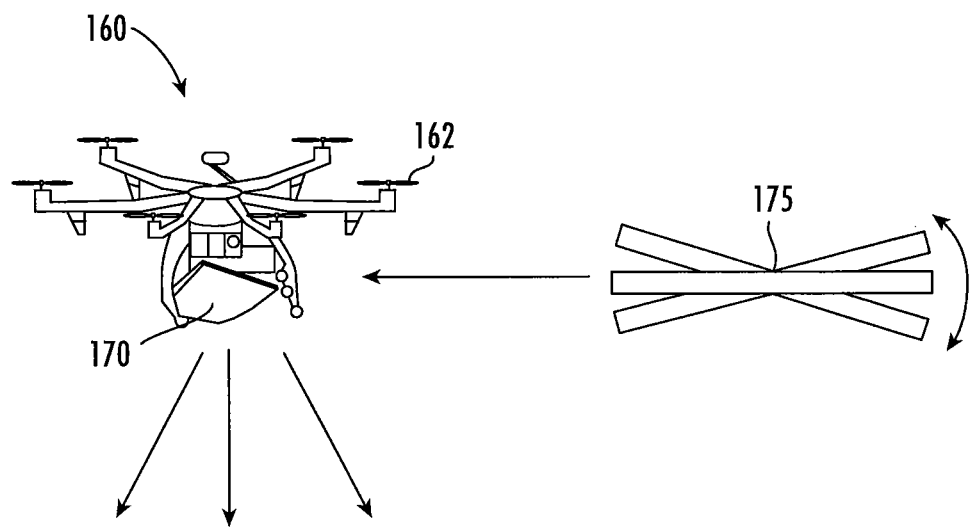
FIG. 8 is a schematic diagram illustrating how drone-mounted radio units may be mounted on mechanically tiltable mounting structures that can be used to adjust the pointing directions of the radio unit antennas.

In some embodiments of the present invention, the radio units 170 may be mounted so that they can be mechanically moved in order to, for example, change the pointing direction of the antennas included in the radio unit 170. This capability may be used to change the antenna pattern of the radio unit 170. For example, as shown schematically in FIG. 8, the radio unit 170 may be mounted on a mounting structure 175 such as a plate or a bracket, and small motors (not shown) may be included on the drone unit 160 that may be used to tilt the mounting structure forwardly, rearwardly and/or to either side. While the same change to the antenna pattern may be accomplished by titling the aerial drone 162, when aerial drones 162 are tilted they tend to want to fly in the direction of the tilt. Accordingly, by providing a mechanism for mechanically tilting the radio unit 170 it may be possible to change the antenna pattern while maintaining the aerial drone 162 in a very stable state.

Figure 10A:
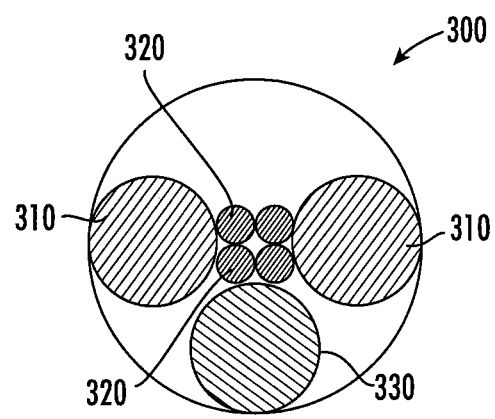
FIGS. 10A and 10B are schematic diagrams that illustrate how tether cables used in embodiments of the present invention may be formed using speed wrap techniques.
Figure 10B:
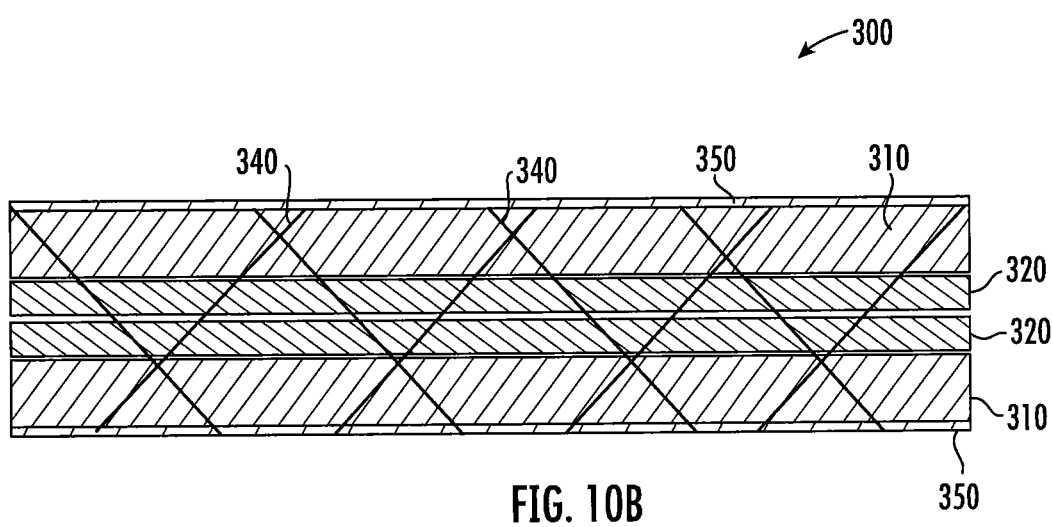

FIGS. 10A and 10B are schematic diagrams that illustrate how tether cables used in embodiments of the present invention may be formed using speed wrap techniques. As discussed above, the power and data connections for the aerial drone and radio unit may be provided over the tether cords that are connected between each drone unit and a corresponding tether box. The size of the power conductors required for the tether cable and/or the number of, for example, optical fibers included in the tether cable may vary depending upon, for example, the specific application for the drone-enabled small cell base station. For example, larger, more powerful (and heavier) drones may be used when the radio unit includes external antennas. The use of such external antennas may also support increased data throughput. Accordingly, when such larger drones and external antennas are used, it may be necessary to use lower gauge (i.e., larger diameter) conductors for the power cable included in the tether cable and/or it may be necessary to include a greater number of optical fibers. As another example, in applications where the aerial drones are only flown at relatively low altitudes (e.g., less than 40 meters above the ground) it may be possible to use higher gauge (i.e., smaller diameter) conductors for the power cable included in the tether cable. Thus, a large number of different tether cable configurations may be necessary or desirable to support different applications.

Pursuant to further embodiments of the present invention, methods of forming tether cables using speed-wrapping techniques are provided so that tether cables may be quickly formed from standard component cables/parts to meet the needs of any particular application. FIGS. 10A and 10B schematically illustrate an example tether cable 300 formed through such a speed-wrapping technique. As shown in FIG. 10A, in one example embodiment, a tether cable 300 may include a pair of 24 gauge insulated copper power conductors 310, four single mode buffered optical fibers 320 and a Kevlar strength yarn or fiber 330. The tether cable 300 may be formed by selecting the individual cables, conductors and/or optical fibers that are required to form the tether cable 300 and then running those individual cables, conductors and/or optical fibers through a speed wrap process in which a web 340 formed of Kevlar or other high strength fibers is wrapped around the bundle of individual cables, conductors and/or optical fibers to form a single cable bundle. A coating 350 such as a plastic or rubberized coating may be applied over the web 340 to reduce the possibility of the web snagging during spooling or despoiling of the tether cable 300.

The drone-enabled small cell base stations according to embodiments of the present invention may be used in a wide variety of applications. For example, in further embodiments, a drone-enabled small cell base station may provide emergency cellular coverage for an individual residence. In this application, a single drone unit might be used that would tether to the central hub, although in some cases tether boxes could be used instead. The central hub could be pre-connected to the core network and remain dormant until needed, and could be pre-connected to a generator such as a natural gas generator that could automatically provide power in the event of a power outage. In some embodiments, the drone-enabled small cell base station could be autoconfigured to power-up the central hub, connect to the core network and deploy the drone unit upon detection of a power outage (or upon detection of a power outage exceeding a pre-selected minimum amount of time). Such a solution could provide automatic connectivity during power outages or local disruptions to cellular service in the same way that many homes are equipped with generators that automatically restore power during power outages.

In some embodiments, the system could also be tied in with a household security system for the residence. In such embodiments, surveillance cameras could be mounted on the one or more drone units. When the household security system detects a potential security event and issues an alarm, the drone unit could be configured to automatically deploy, rapidly providing video coverage of the residence and surrounding area.

As another example, the drone-enabled small cell base stations according to embodiments of the present invention may be used to provide extra coverage and/or capacity for malls and/or shopping centers. For example, during the holiday shopping season, traffic at shopping malls may increase significantly and may exceed the normally available capacity, resulting in frustration for shoppers. One or more drone-enabled small cell base stations could be deployed during such peak shopping seasons within the malls/shopping centers to meet the increased capacity demand, and these drone-enabled small cell base stations could then be used throughout the rest of the year in other applications. Given the ease of installation and set-up, this solution may help reduce capital investment while still providing coverage and capacity when needed. In addition, in some embodiments, surveillance cameras could be mounted on the drone units to provide enhanced security.

In a similar manner, the drone-enabled small cell base stations according to embodiments of the present invention may be used to provide increased coverage or capacity at special event venues such as sporting events, concerts, conventions and other events where a large number of users visit a site for a limited amount of time. The drone-enabled small cell base stations may be particularly well-suited to service such events when they are held at non-traditional venues that normally do not require high capacity. As a simple example, some major golf tournaments are held at different golf courses each year. These golf courses normally would have relatively low capacity requirements, but capacity would spike to extremely high levels for a very short time if a golf course is selected to hold a major tournament. There are currently no particularly good solutions for providing a significant capacity increase in this situation, since providing a permanent capacity increase to solve the problem is costly and inefficient.

In still other embodiments, the drone-enabled small cell base stations could be deployed when responding to disasters or other emergency situations and could leverage Internet of Things ("IoT") and/or Software Defined Networks ("SDN") mesh networks to provide a system solution for communications, video, RF coverage and capacity.

As noted above, in some embodiments, the central hub may also include a drone compartment, tether cable and associated drone unit so that the central hub can perform the functionality of both a central hub and a tether box. In fact, as some applications envision use of only a single drone unit, in some embodiments, various of the functionality of the central hubs described above may be omitted and the central hub may, in effect, merely serve as a tether box having an associated baseband controller and backhaul capabilities to connect to the core network. In some such embodiments, such as the above-described residential applications, the central hub may be designed as a permanent container having a lower portion that houses the generator, power supplies, baseband controller, backhaul equipment and Ethernet switches. The upper portion of the container may include the drone compartment and tether box electronics and equipment. The lid of the container may be designed to automatically open and launch the drone under predefined circumstances. Positioning sensors may be provided on the container and/or drone to ensure proper alignment when the drone lands.

The above description of drone-enabled small cell base stations according to embodiments of the present invention primarily describes transmission of power and data signals from the central hub to the tether boxes and drone units. It will be appreciated, however, that the data transmissions are two-way transmissions in that the drone units also transmit data back to the central hub through the tether boxes. Thus, all necessary equipment for such return communications is integrated into the components of embodiments of the present invention that are described above. As one simple example, the above description explains how optical-to-electrical converters are included in the media converters and/or Ethernet switches to convert the fiber optic data signals into Ethernet transmissions. To allow for the return path communications, electrical-to-optical converters are likewise provided in the media converters and/or Ethernet switches to convert the Ethernet outputs from the radio points into fiber optic data signals that can be carried over, for example, the tether cable and power-over-fiber cabling connections to the central hub.

It will likewise be appreciated that numerous changes can be made to the above-described embodiments without departing from the scope of the present invention. For example, while embodiments of the present invention have primarily been described with reference to sending DC power signals from the tether boxes to the drone units, it will be appreciated that in other embodiments AC power signals may be transmitted instead. As another example, while the drone-mounted media converters are shown as stand alone units, in other embodiments the media converters can be integrated into other components such as, for example, the radio points. As another example, a wide variety of different power connections may be used to provide power to the aerial drones and radio points. For example, power may be provided from the power cable to the radio point and from the radio point to the aerial drone, from the power cable to the aerial drone to the radio point, from the power cable to the aerial drone and the radio point over two separate connections, or in various other ways. As yet another example, other radio units may be used such as WiFi access points.

The present invention has been described above with reference to the accompanying drawings. The invention is not limited to the illustrated embodiments; rather, these embodiments are intended to fully and completely disclose the invention to those skilled in this art. In the drawings, like numbers refer to like elements throughout. Thicknesses and dimensions of some elements may not be to scale.

Spatially relative terms, such as "under", "below", "lower", "over", "upper", "top", "bottom" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity. As used herein the expression "and/or" includes any and all combinations of one or more of the associated listed items.

A variety of different embodiments have been disclosed above. It will be appreciated that aspects of these different embodiments may be combined in any and all possible ways to provide a plurality of additional embodiments, and that these different embodiments may be used in any f the applications discussed herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention.

That which is claimed is:

1. A base station system, comprising:
a central hub having a baseband controller and a backhaul connection to an external network;
a plurality of freestanding remote units that are directly connected to the central hub by respective wired power and cabling connections;
a plurality of drone units, each of the plurality of drone units comprising an aerial drone and a radio unit mounted on the aerial drone, the plurality of drone units being connected to the plurality of freestanding remote units by a plurality of tether cables, respectively, and being configured to receive power over the plurality of tether cables;
wherein the radio units are operated under control of the baseband controller to form a super cell that appears as a single base station to the external network.

2. The base station system of claim 1, wherein the wired power and cabling connections comprise power-over-fiber cabling connections.

3. The base station system of claim 2, wherein at least some of the freestanding remote units include a respective media converter that is configured to convert fiber optic data received over the respective power-over-fiber cabling connections into Ethernet data that is communicated to the respective radio unit via respective Ethernet cables, wherein the Ethernet cables are also configured to function as tether cables for the respective drone units.

4. The base station system of claim 1, wherein each tether cable comprises a power-over-fiber tether cable.

5. The base station system of claim 4, wherein at least some of the drone units include a respective media converter that is configured to convert fiber optic data received over the respective power-over-fiber tethers cable into respective Ethernet data that is communicated to the respective radio units via respective Ethernet cables and to convert power signals received over the respective power-over-fiber tether cables into respective Power-over-Ethernet power signals that are supplied to the respective radio units over the respective Ethernet cables.

6. The base station system of claim 1, wherein at least some of the freestanding remote units are powered by the respective power cabling connections that extend between the central hub and the respective freestanding remote units.

7. The base station system of claim 6, wherein the central hub includes a power supply that adjusts a voltage of a power signal that is provided over a first of the power cabling connections to a first of the freestanding remote units in response to variations in the current drawn by the load at the first of the freestanding remote units.

8. The base station system of claim 7, wherein the voltage of the power signal that is provided over the first of the power cabling connections to the first of the freestanding remote units is adjusted so that a voltage of the power signal as measured at the first of the freestanding remote units remains substantially constant.

9. The base station system of claim 1, wherein at least some of the freestanding remote units include boost converters.

10. The base station system of claim 1, wherein a first of the freestanding remote units includes an Ethernet switch, and a power-over-fiber cabling connection extends from the first of the freestanding remote units to a second of the freestanding remote units.

11. The base station system of claim 1, wherein the radio units are mounted on respective aerial drones of the drone units via motorized mounting structures that are configured to change a physical orientation of the radio units.

12. A method of operating a small cell base station, the method comprising:
receiving a radio frequency ("RF") communication from a user at one of a plurality of radio units, the plurality of radio units being mounted on a plurality of aerial drones, respectively, the plurality of aerial drones being connected to a plurality of freestanding remote units by a plurality of tether cables, respectively;
powering the plurality of aerial drones and the plurality of radio units via power signals supplied to the plurality of aerial drones and the plurality of radio units from the plurality of freestanding remote units over the plurality of tether cables;
transmitting data contained in the received RF communication from the one of the plurality of radio units to one of the plurality of freestanding remote units over one of the plurality of tether cables; and
transmitting the data contained in the received RF communication from the one of the plurality of freestanding remote units to a central hub over a power-over-fiber system;
wherein the central hub is directly connected to the plurality of remote units and comprises a baseband controller and a backhaul connection to an external network such that the radio unit in combination with the central hub appears as a single base station to the external network.

13. The method of claim 12, further comprising powering electronic equipment in the plurality of freestanding remote units by supplying a power signal to the plurality of freestanding remote units over power cabling connections that extend between the central hub and the plurality of freestanding remote units.

14. The method of claim 13, wherein the central hub includes a power supply that adjusts a voltage of the power signal in response to variations in the current drawn by the load at the one of the plurality of freestanding remote units.

15. The method of claim 12, wherein transmitting data contained in the received RF communication from the one of the plurality of radio units to the one of the plurality of freestanding remote units over the one of the plurality of tether cables comprises transmitting the data contained in the received RF communication over the one of the plurality of ether cables as a fiber optic signal.

16. The method of claim 12, wherein each of the plurality of freestanding remote units includes a boost converter that steps up the voltage of the power signal to a voltage exceeding 300 volts.

17. The method of claim 16, wherein the plurality of radio units all communicate through the central hub to form a super cell small cell base station.

18. The method of claim 12, wherein each of the plurality of tether cables comprises at least two power conductors and at least one fiber optic cable bound in a fiber web.

19. The method of claim 18, wherein each of the plurality of tether cables further comprises a protective coating that covers the fiber web, and wherein the fiber web comprises a Kevlar web.

* * * * *

UNITED STATES PATENT AND TRADEMARK OFFICE
CERTIFICATE OF CORRECTION

PATENT NO. : 10,498,566 B2
APPLICATION NO. : 15/936539
DATED : December 3, 2019
INVENTOR(S) : Bryan K. Kennedy It is certified that error appears in the above-identified patent and that said Letters Patent is hereby corrected as shown below:

In the Claims

Column 23, Line 5, Claim 15:
Please correct "ether cables" to read -- tether cables --

Signed and Sealed this
Eighteenth Day of February, 2020

Andrei Iancu
*Director of the United States Patent and Trademark Office*